United States Patent
Mastroianni et al.

(10) Patent No.: US 9,357,794 B2
(45) Date of Patent: Jun. 7, 2016

(54) HOT AIR POPCORN POPPER WITH DUAL WALL CONSTRUCTION

(71) Applicant: Focus Products Group International, LLC, Lincolnshire, IL (US)

(72) Inventors: Michael R. Mastroianni, Crystal Lake, IL (US); Rong Liu, Vernon Hills, IL (US); Bikram Sohi, Buffalo Grove, IL (US); William A. Bucklew, Wilmette, IL (US)

(73) Assignee: FOCUS PRODUCTS GROUP INTERNATIONAL, LLC, Lincolnshire, IL (US)

( * ) Notice: Subject to any disclaimer, the term of this patent is extended or adjusted under 35 U.S.C. 154(b) by 0 days.

(21) Appl. No.: 14/341,416

(22) Filed: Jul. 25, 2014

(65) Prior Publication Data

US 2015/0047511 A1 Feb. 19, 2015

Related U.S. Application Data

(63) Continuation-in-part of application No. 14/168,393, filed on Jan. 30, 2014, and a continuation-in-part of application No. 14/280,989, filed on May 19, 2014.

(60) Provisional application No. 61/866,723, filed on Aug. 16, 2013.

(51) Int. Cl.
*A23L 1/18* (2006.01)

(52) U.S. Cl.
CPC ................................. *A23L 1/1812* (2013.01)

(58) Field of Classification Search
CPC ..................................................... A23L 1/1812
USPC .............................. 99/323.4–323.11; D7/325
See application file for complete search history.

(56) References Cited

U.S. PATENT DOCUMENTS

| 2,922,355 | A | * | 1/1960 | Green | 99/323.11 |
| 3,611,910 | A | | 10/1971 | Hughes | |
| 4,152,974 | A | | 5/1979 | Tienor | |

(Continued)

FOREIGN PATENT DOCUMENTS

| CN | 2845669 Y | 12/2006 |
| GB | 2144208 A | 2/1985 |

(Continued)

OTHER PUBLICATIONS

"Hamilton Beach 50754 WaveStation 10-Speed Dispensing Blender", http://www.amazon.com.

(Continued)

*Primary Examiner* — Thien S Tran
(74) *Attorney, Agent, or Firm* — Thompson Coburn LLP

(57) ABSTRACT

A popcorn popping unit comprises a blower unit and a popping vessel. The popping vessel has first and second parts assemblable with one another to form the popping vessel. The first part is operatively mounted on the blower unit and the second part has an opening configured to vent pressurized air generated by the blower during cooking operations from the popping vessel through the opening. The popping vessel has at least a portion with inner and outer walls spaced apart from one another to form a double wall construction for the at least portion of the popping vessel. The inner wall may comprise glass and the outer wall may comprise plastic. The inner and outer walls may be transparent.

9 Claims, 17 Drawing Sheets

(56) References Cited

U.S. PATENT DOCUMENTS

| | | | |
|---|---|---|---|
| 4,178,843 | A | 12/1979 | Crabtree et al. |
| 4,512,247 | A * | 4/1985 | Friedman .................. 99/323.5 |
| 4,702,158 | A * | 10/1987 | Ishihara .................... 99/323.5 |
| 4,885,917 | A | 12/1989 | Spector |
| 4,887,909 | A | 12/1989 | Bennett |
| 4,947,740 | A | 8/1990 | Strawser et al. |
| 5,360,176 | A | 11/1994 | Mugge et al. |
| 7,364,348 | B1 | 4/2008 | Jones |
| 7,371,004 | B1 | 5/2008 | Branson, III et al. |
| D615,347 | S | 5/2010 | Garman et al. |
| D669,304 | S | 10/2012 | Bock et al. |
| 8,529,118 | B2 | 9/2013 | Davis et al. |
| 2002/0176320 | A1 | 11/2002 | Wulf et al. |
| 2005/0047272 | A1 | 3/2005 | Sands |
| 2007/0056448 | A1 | 3/2007 | Kernan |
| 2007/0292578 | A1 | 12/2007 | Baschnagel |
| 2008/0031087 | A1 | 2/2008 | Pryor |
| 2009/0186141 | A1 | 7/2009 | Almblad et al. |
| 2012/0107469 | A1 | 5/2012 | Sands |

FOREIGN PATENT DOCUMENTS

| | | |
|---|---|---|
| JP | S5712968 A | 1/1982 |
| WO | 2006/046268 A1 | 5/2006 |

OTHER PUBLICATIONS

"Margaritaville Blender Jumbo Double Wall Insulated Pitcher", http://www.margaritamachinesdirect.com.

* cited by examiner

HOT AIR POPCORN POPPER WITH DUAL WALL CONSTRUCTION

RELATED APPLICATION DATA

This application is a continuation-in-part of application Ser. No. 14/168,393, filed Jan. 30, 2014, currently pending, and a continuation-in-part of application Ser. No. 14/280,989, filed May 19, 2014, currently pending, and this application claims the benefit of provisional application Ser. No. 61/866,723, filed Aug. 16, 2013, the disclosures all of which are incorporated by reference herein.

BACKGROUND AND SUMMARY

This disclosure relates to hot air popcorn poppers. The popcorn popper may be configured to provide a single serving size of popcorn. The popcorn popper may also be configured to provide multiple servings. The popper unit has a cooking portion into which kernels are placed. Hot air is directed into the cooking portion to pop the kernels. The cooking portion may comprise the blower unit, a popping vessel or a carafe. The popped kernels expand upwards and fill the popping vessel or the carafe. The popping vessel or the carafe may have a vent at its top end to allow the hot air used for cooking the kernels to escape from the popping chamber or carafe. The vent may be formed in a lid that otherwise seals the top open end of the carafe. The vent may discharge to another serving dispenser.

In one aspect, once popping is complete, the carafe may be used as a serving container. In a variation of this aspect, the vent at the top of the carafe may be sealed and popper unit may be inverted with the carafe attached to the popper unit so the popped kernels fill the carafe. The carafe may then be removed from the popper unit in the inverted position. The carafe then serves a serving bowl or dispenser and the user may mix seasonings in the carafe. In another variation of this aspect, the carafe may be removed from the popper unit. The bottom of the carafe may have a fine mesh screen, cooking grate or other cooking surface which holds the popped kernels. The carafe may be transferred to a stand-like pedestal to seal the bottom of the carafe. The lid and or vent on the carafe top end may be fully opened to allow use of the carafe as a serving bowl or dispenser from the carafe top, and the user may mix seasonings in the carafe.

In another aspect, a hood may be detachably connected to the carafe and popped kernels may be directed out of the hood to a separate serving dispenser. In another aspect, the popping chamber may comprise first and second parts removably assemblable with one another to form the popping chamber.

DETAILED DESCRIPTION

Figure 1:
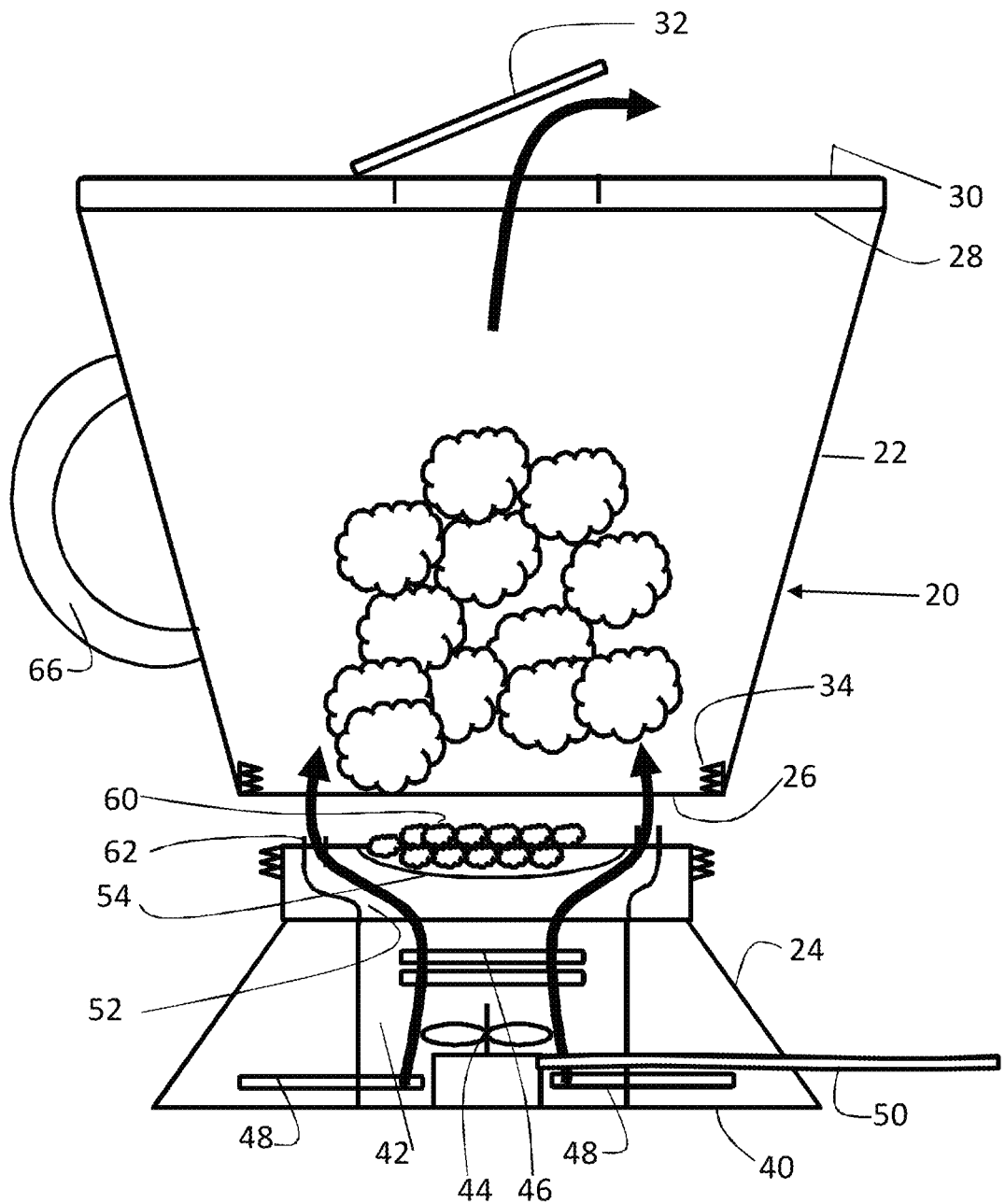
FIG. 1 shows a cross-sectional view of a popcorn popping unit with a carafe detached from a blower unit to illustrate the cooperative relationship therebetween.

FIG. 1 shows a cross-sectional view of one embodiment of the popping unit 20. The popping unit 20 comprises a carafe 22 and a blower unit 24. The carafe 22 has an open bottom 26 which detachably connects to the blower unit 24. Opposite the open bottom 26 is a top 28 which is generally sealable with a lid 30. The lid 30 may be removably attachable to the carafe 22. The lid 30 may have a hinged or flip style vent or opening 32 to allow hot air from the blower unit to pass through the carafe during popping operations. As shown in the drawings, the flip vent 32 may be pivotally connected and snapped to the lid. The lid 30 may be removable from the carafe to allow cleaning. While a flip top vent is shown, other types of vents may be formed in the lid, including a louvered opening, an iris opening, or perforations (FIGS. 11-14). The open bottom 26 of the carafe may be internally threaded 34 or have other removably attachable connections to allow the carafe to be removably attached to the blower unit.

The blower unit 24 may comprise a housing 40 with a hollow interior 42. In the hollow interior 42 of the housing is a blower fan 44 and a heating element 46. Ambient air may be drawn into the hollow interior 42 through openings 48 in the housing exterior through action of the blower fan 44 and pass over the heating element 46. The blower fan 44 and/or heating element may be battery powered or powered from an external AC or DC power source with a power cord 50. The blower fan and/or heating element may be deenergized with a switch (not shown) located on the housing or the power cord. The switch may be manual or operate via a timer. A plenum 52 may direct the heated air to the upper part of the housing after passing over the heating element 46. The upper part of the housing may have a cooking surface or grate 54 upon which unpopped kernels 60 are placed. The hot air may exit the plenum and circulate around the cooking surface, heating the kernels, and enabling the kernels to pop. Once the kernels pop, they may expand upward into the carafe through the carafe open bottom 26. The heated air may flow through vents 62 in the upper part of the housing into the carafe after circulating around the cooking surface or grate. The pressurized, heated air may push the popped kernels away from the cooking surface or grate 54 into the carafe thereby allowing the unpopped kernels to cook and expand. Hot air may pass out through the flip vent 32 on the lid 30 during cooking operations.

Figure 2:
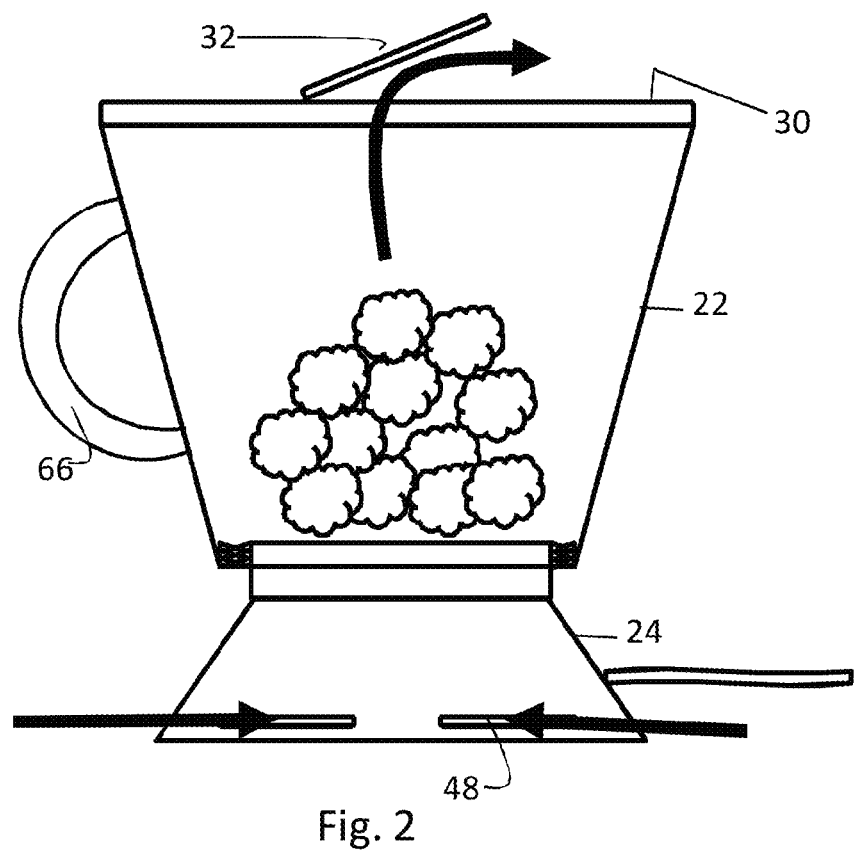
FIG. 2 shows the popping unit of FIG. 1 in the popping mode with a flip vent on a lid of the carafe in an open position.

FIG. 2 shows a step in a method of using the popping unit 20. In FIG. 2, popping operations are occurring. In FIG. 2, the flip vent 32 is open and air is drawn in through the openings 48 of the housing of the blower unit 24 by the blower fan to be heated by the heating element. The heated air circulates around the cooking surface or grate 52, heating the kernels and allowing them to pop into the carafe 22. The heated air may flow from the housing of the blower unit 24 into the carafe 22 and out through the flip vent 32.

Figure 3:
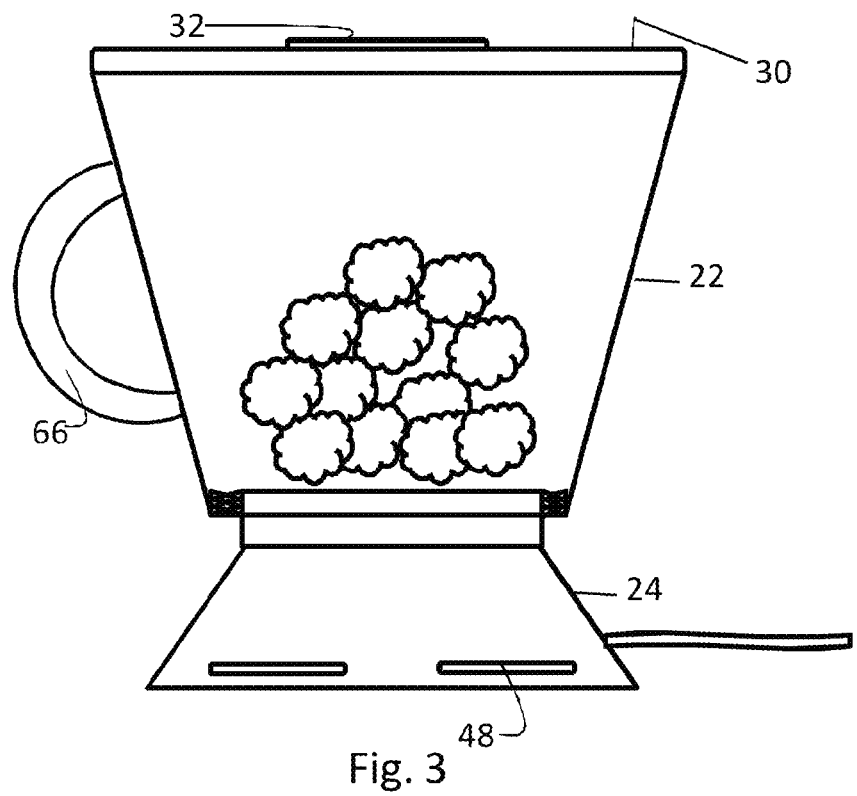
FIG. 3 shows the popping unit of FIG. 1 with the flip vent on the lid of the carafe in a closed position after popping is complete prior to inversion of the popping unit.

FIG. 3 shows another step in a method of using the popping unit after cooking operations are complete. Once operations are complete, the flip vent 32 top may be moved from the open position to the closed position. When popping is complete, the blower motor and heater may be de-energized. De-energization of the blower and heating element may occur via a timer or may be performed manually by the user with a switch after determining that all of the kernels have popped.

Figure 4:
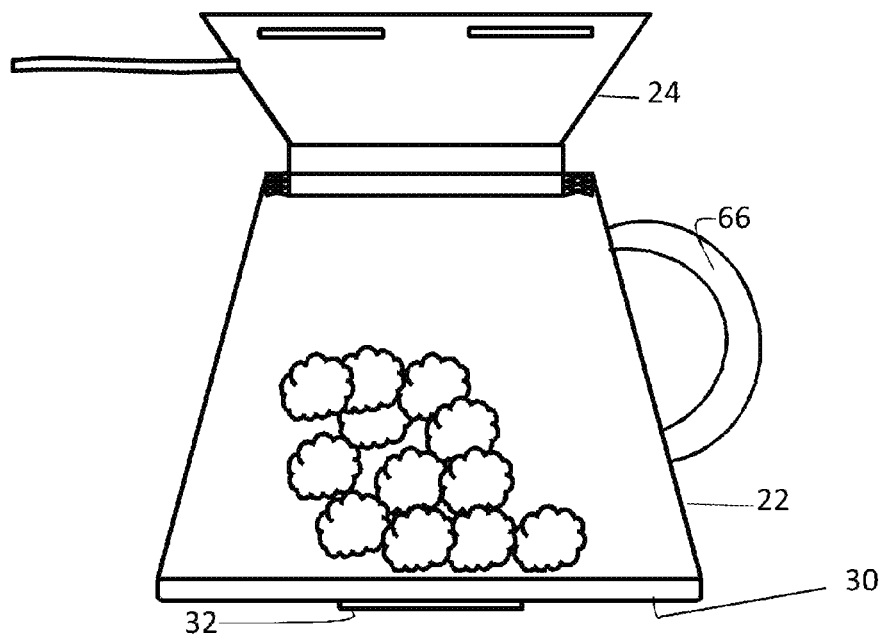
FIG. 4 shows the popping unit of FIG. 1 in an inverted position prior to the blower unit being disconnected from the carafe.
Figure 5:
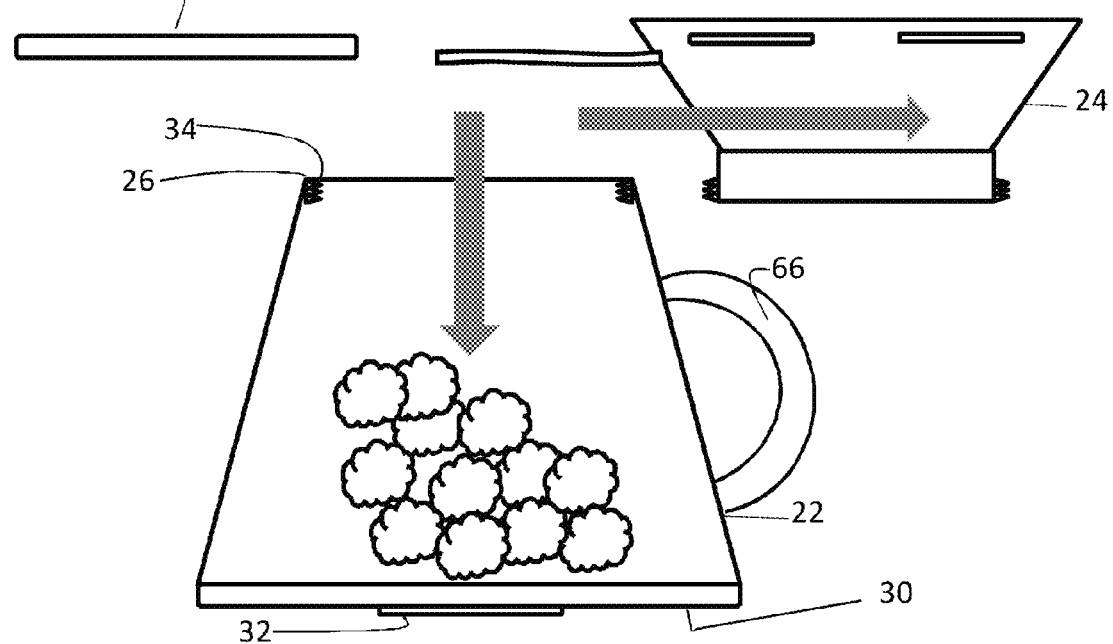
FIG. 5 shows the popping unit of FIG. 1 with the blower unit removed allowing access to the carafe for use of the carafe as a serving bowl or dispenser.

FIG. 4 shows another step in a method of using the popping unit in an inverted position. FIG. 5 shows another step in a method of using popping unit where the blower unit 24 being disconnected from the carafe 22, and use of the carafe as a serving dispenser. An optional secondary lid 64 may be placed on the open bottom end 26 to allow transportation of the carafe by the user. The secondary lid 64 may also allow the user to maintain the temperature of the popped corn longer and allow mixing of seasonings by shaking the carafe with the top and bottom lids installed. Seasonings and butter may be placed in the serving dispenser as desired through the open bottom of the carafe. With the flip vent 32 closed, the lid 30 at the carafe top forms a seal to contain the popcorn and seasonings. The secondary lid 64 and top lid 30 may form closures that are sufficient to allow normal movement of the carafe during use by the user without contents of the carafe leaking from the carafe. The closures may be sufficient to contain liquids inside the carafe. Thus, the carafe may be used on-the-go or as a travel mug with popcorn. A handle 66 may be provided. The secondary lid 64 may have an access hole (not shown) to allow the user to consume the contents of the carafe with the secondary lid installed.

Figure 6:
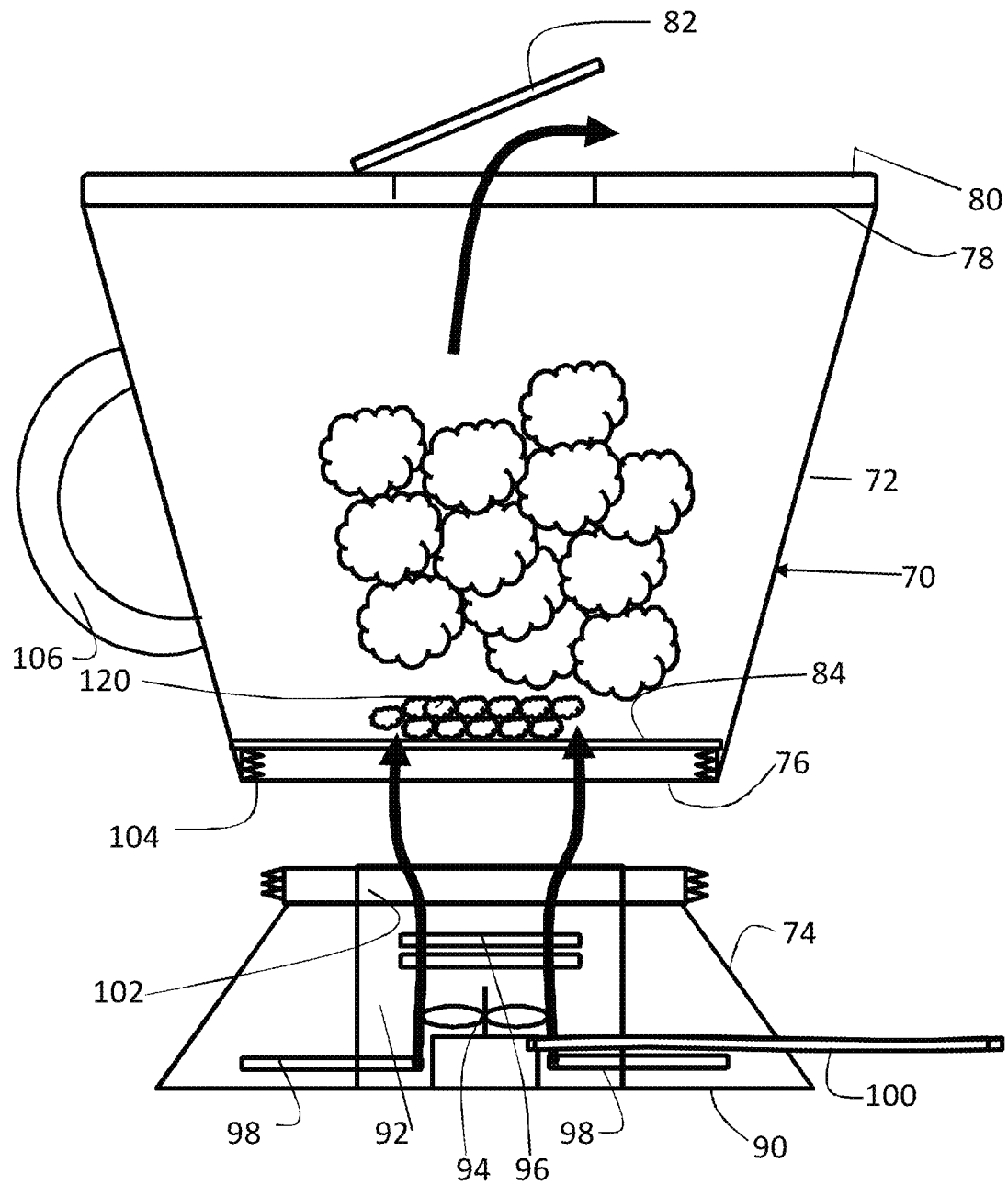
FIG. 6 shows a cross sectional view of an alternate embodiment of the popping unit of FIG. 1 with a carafe detached from a blower unit to illustrate the cooperative relationship therebetween.

FIGS. 6-10 show an alternate embodiment of the popping unit. In FIG. 6, the popping unit 70 comprises a carafe 72 and a blower unit 74. The carafe 70 has a top 78 with a lid 80 and flip vent 82, and a bottom 76 opposite the top with a cooking surface and/or screen 84. The cooking surface and/or screen 84 is sized in such a way that the kernels 120 may be placed directly on the cooking surface and/or screen. The cooking surface and/or screen may be removable from the carafe for cleaning. The carafe 72 may be removably attached to the blower unit 74. The open bottom 76 of the carafe may be internally threaded 104 or have other removably attachable connections to allow the carafe to be removably attached to the blower unit. The threaded connection 104 may be proximate the open bottom with the cooking surface and/or screen positioned above the threaded connection.

The blower unit may comprise a housing 90 with a hollow interior 92 with a blower fan 94 and a heating element 96 in the hollow interior. The blower fan 94 and/or heating element 96 may be battery powered or powered from an external AC or DC power source with a power cord 100. The blower fan and/or heating element may be deenergized with a switch (not shown) located on the housing or the power cord. The switch may be manual or operate via a timer. The housing 90 has openings 98 to allow air to be drawn into the housing by action of the blower fan 94 and heated by action of the heating element 96. The heated air may then be directed through an outlet 102 of the housing into the carafe 90 through the cooking surface and/or screen 84 in the bottom of the carafe. The kernels 120 may be placed on the screen inside the carafe and be heated directly from the heated air from blower unit. The heated air may cause the kernels to pop and expand upward in the carafe to allow more even heating and cooking of the kernels.

Figure 7:
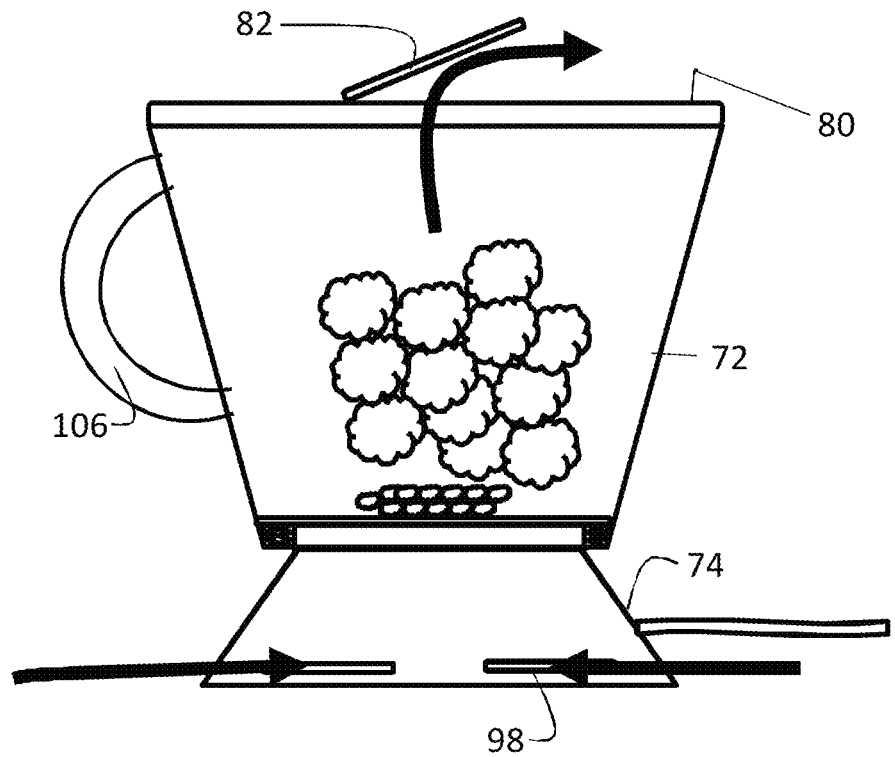
FIG. 7 shows the popping unit of FIG. 6 during popping with a flip vent on a lid of the carafe in an open position.

FIG. 7 shows a step in a method of using the popping unit of FIG. 6 during cooking operations. The flip vent 82 of the lid 80 is open. The kernels are placed on the cooking surface and/or screen. Hot air is drawn in through the openings 98 into the hollow interior of the housing of the blower unit 74, and heated and blown through the screen (and/or adjacent the cooking surface) to heat and pop the kernels. The popped kernels expand upward in the carafe 72.

Figure 8:
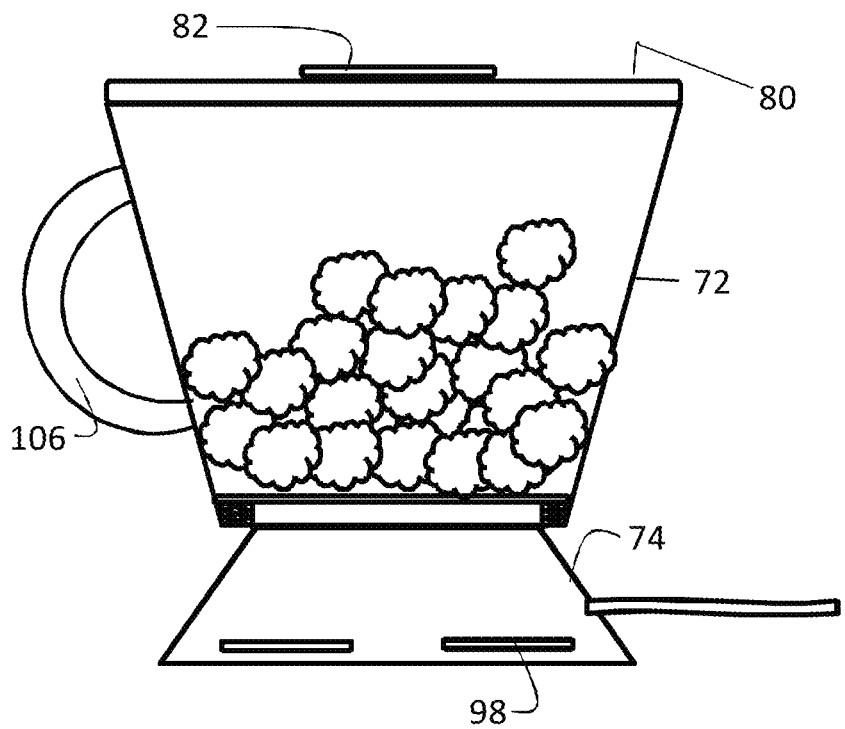
FIG. 8 shows the popping unit of FIG. 7 with the flip vent on the lid of the carafe in a closed position after popping is complete.

FIG. 8 shows another step in a method of using the serve popping unit of FIG. 6 after cooking operations are complete. The flip vent 82 of the lid 80 may be closed. The blower fan and heating element may be de-energized. As stated before, the heating element and blower fan may be de-energized after a fixed time or may be manually de-energized by the user with a switch after popping is complete.

Figure 9:
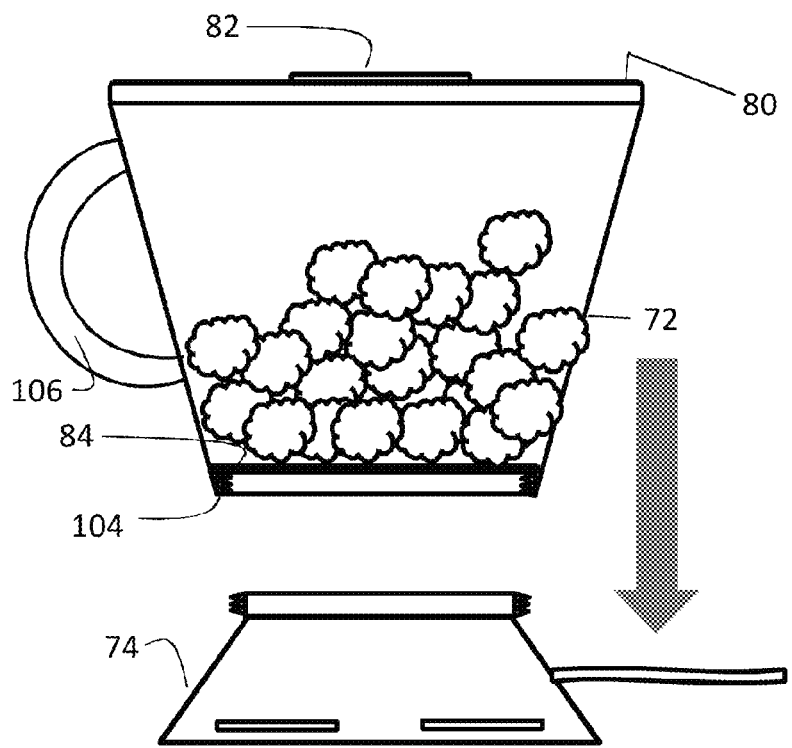
FIG. 9 shows the blower unit being disconnected from the carafe and popped kernels being supported by a screen in the bottom of the carafe.

FIG. 9 shows another step in a method of using the popping unit including preparing the carafe for use. The blower unit 74 may be detached from the carafe 72. The screen supports 84 the popped kernels, allowing them to remain in the carafe and preventing them from falling out through the bottom of the carafe.

Figure 10:
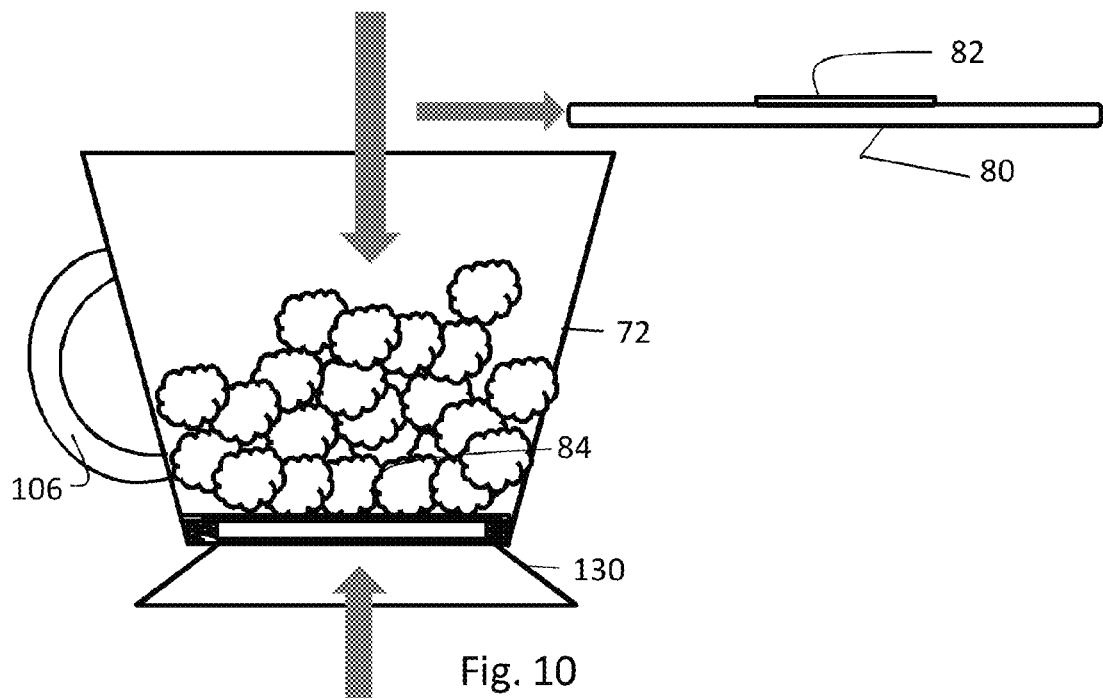
FIG. 10 shows the carafe being placed on a pedestal and the lid of the carafe being removed allowing the carafe to be used as a serving dispenser.
Figure 11:
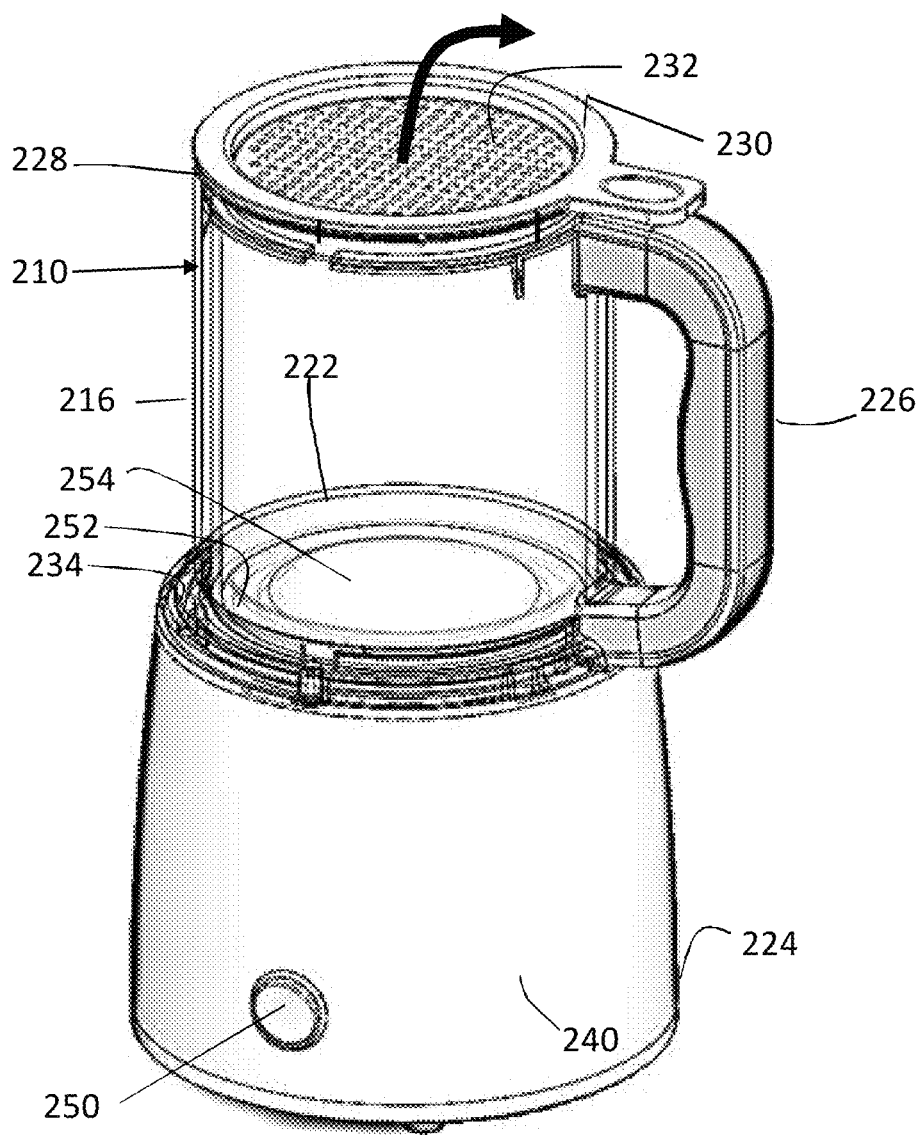
FIG. 11 shows a perspective view of an alternate embodiment of a popping unit with a double wall carafe.
Figure 12:
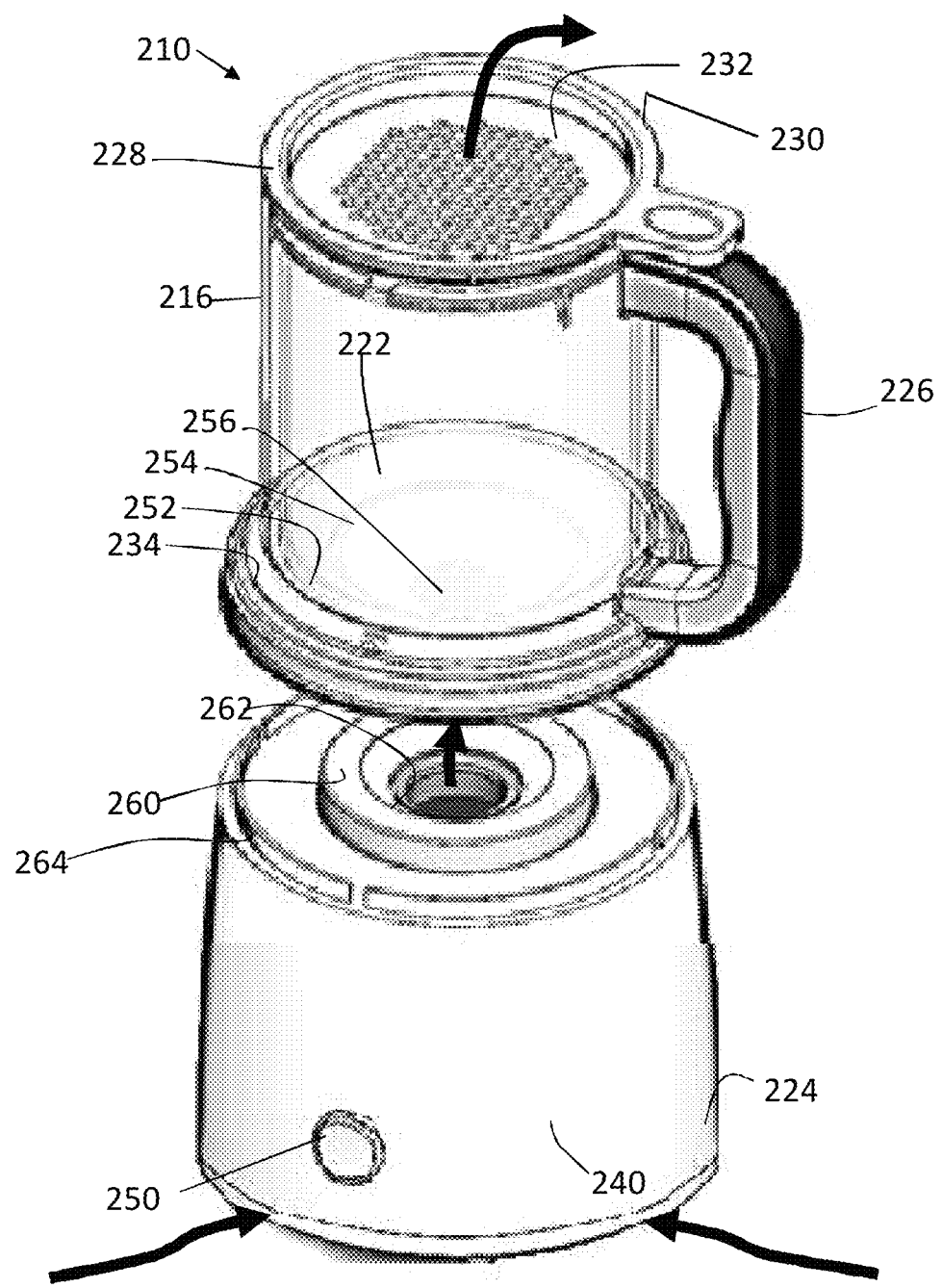
FIG. 12 shows a perspective view of the popping unit of FIG. 11 removed from the base blower unit.
Figure 13:
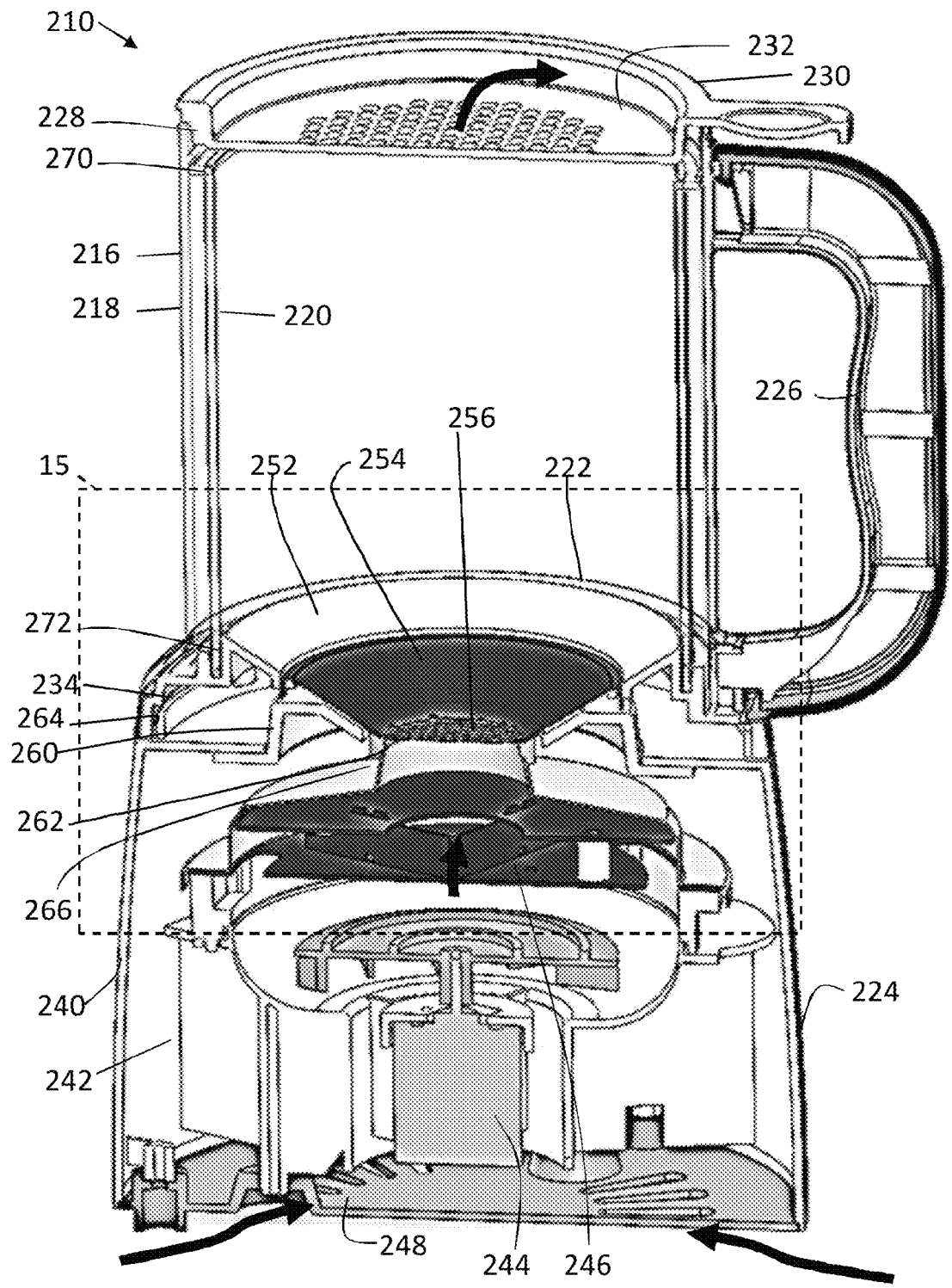
FIG. 13 is a cross section view of the popping unit of FIG. 11.
Figure 14:
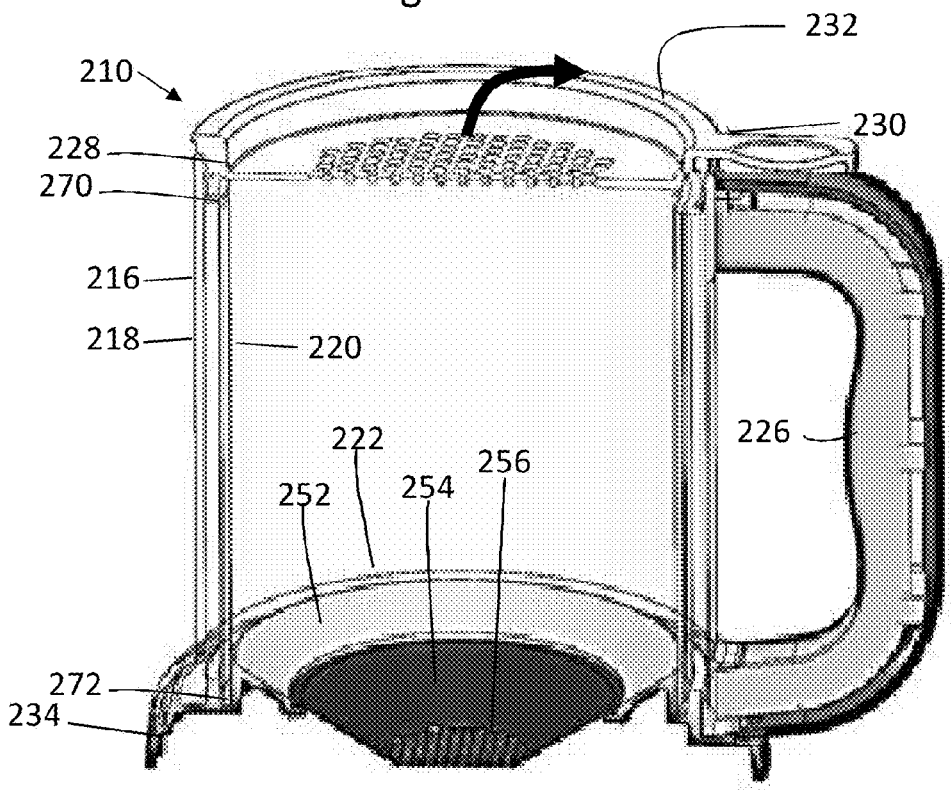
FIG. 14 is a cross section view of the popping unit of FIG. 12.
Figure 14:
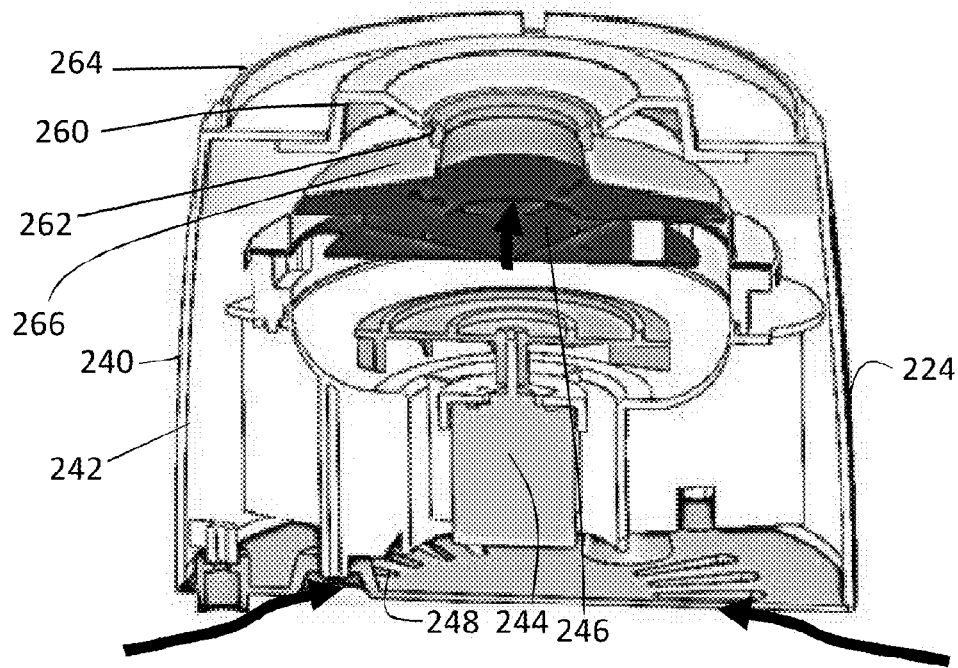
Figure 15:
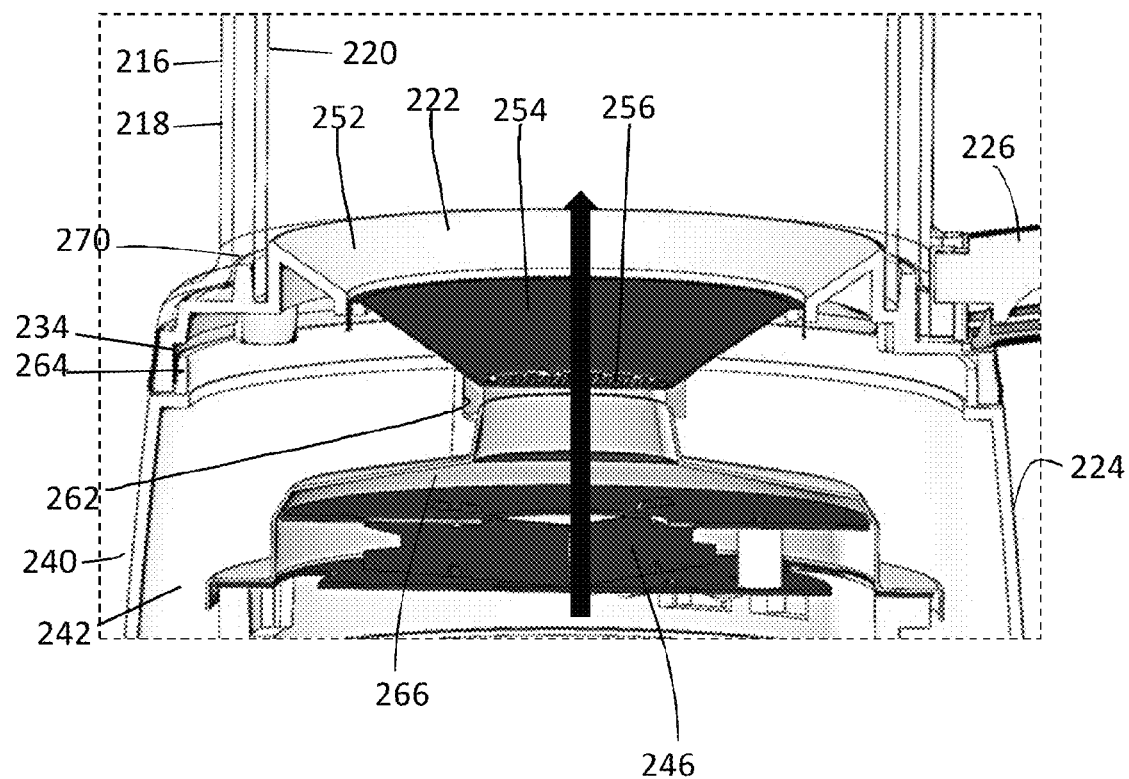
FIG. 15 is an enlarged cross section view from detail area 15 of FIG. 13.

FIG. 10 shows another step in a method of using the popping unit where the carafe being placed on a pedestal serving stand 130. The pedestal serving stand 130 may have a connection allowing the carafe to be detachably connected thereto with the screen installed therebetween. The lid 80 may then be removed. Seasonings and butter may be applied to the popped kernels, and the carafe and stand may function as a serving bowl or dispenser for the popcorn with the pedestal forming a seal at the bottom of the carafe. The stand allows the user to maintain the temperature of the popped corn longer and allow mixing of seasonings by shaking the carafe with the lid and the stand installed. The top lid and pedestal may form closures that are sufficient to allow normal movement of the carafe during use by the user without contents of the carafe leaking from the carafe. The closures may be sufficient to contain liquids inside the carafe. Thus, the carafe may be used on-the-go or as a travel mug with popcorn. A handle 106 may be provided. The lid 80 may have an access hole (not shown) to allow the user to consume the contents of the carafe with the secondary lid installed.

FIGS. 11-16 provide additional embodiments of popping unit with a carafe 216 detachably connected to a blower unit 224. The carafe may have a handle 226. The carafe 216 may comprise an insulated double wall construction. Specifically, the carafe 216 double wall construction may comprise a high temperature plastic outer shell 218 and a glass inner surface 220 spaced from the outer shell with a gap therebetween that provides an insulating effect. The gap may be air, a liquid, or a vacuum. The outer wall may comprise a plastic material such as material sold under the brand name Tritan™ sold by the Eastman Chemical Company, or may comprise a polycarbonate plastic. The glass inner wall may comprise a tempered glass.

The carafe 216 may have a base 222 that defines a bottom of the carafe, and a top opening 228 opposite the base that may receive a lid 230 having perforations 232 that allow hot air to escape from the carafe 216. The perforations may be sized sufficiently to retain popped kernels in the carafe while allowing hot air to escape from the carafe during operation. The lid 230 may be detachably connected to the carafe 216 at the top opening 228 to allow the user to detach the lid from the carafe and use the carafe as a serving dispenser once popping is complete.

The blower unit may have a construction similar to the embodiments of FIGS. 6-10. The blower unit 224 may comprise a housing 240 with a hollow interior 242 with a blower fan 244 and a heating element 246 in the hollow interior. The blower fan 244 and/or heating element 246 may be battery powered or powered from an external AC or DC power source with a power cord (not shown). The blower fan and/or heating element may be deenergized with a switch 250 located on the housing, or alternatively on the power cord (not shown). The switch may be manual or operate via a timer. The housing 240 may have openings 248 on a base of the housing to allow air to be drawn into the housing by action of the blower fan 244 and heated by action of the heating element 246.

The carafe base 222 may comprise an outer ring 252 formed from a high temperature material such as nylon, glass or phenolic. The outer ring 252 may surround a cooking surface 254 and a grate 256. The cooking surface 254 and the grate 256 may be made from stainless steel. The cooking surface 254 and the cooking grate 256 support the kernels. Hot air passes through the grate 256 into the carafe in cooking the kernels. The outer ring 254 may have a spacer guide 272 extending axially from its peripheral edge setting the spacing between the outer shell 218 and the inner wall 220.

The outer ring 254 may have grooves adjacent the spacer guide 272 to radially support and fix the outer shell 218 and the inner wall 220 to the base 222 such that the carafe 216 is an integrated unit. A silicone seal 270 may be provided between the inner and outer walls for heat insulation. The silicone seal 270 may be provided adjacent to the outer ring 252 and spacer guide 272 on the carafe base 222 and also adjacent to the carafe top opening 228. The outer ring 254 may also have geometry 234 on its outer periphery allowing it to be removably attached to the blower unit 224. The outer ring geometry 234 may enable the carafe 216 to be rotatably detachably connected to the blower unit 224, for instance, by a quarter turn locking screw thread.

The blower unit housing 240 may have an outlet 260 that directs heated air from the housing into the carafe 216 through the cooking grate 256 in the base 222 of the carafe. The kernels may be placed on the cooking screen 256 inside the carafe and be heated directly from the heated air from blower unit exiting from the outlet 260. The heated air may cause the kernels to pop and expand upward in the carafe to allow more even heating and cooking of the kernels. The outlet 260 may have a mounting surface that cooperates with the base 222 of the carafe 216. For instance, as shown in the drawings, the base 222 of the carafe 216 may have a frustoconical shape. The outlet 260 of the housing 240 of the blower unit 224 may have a matching frustoconical shape to securely attach the carafe 216 to the blower unit. A gasket 262 may be provided on the outlet 260 to prevent hot air from leaking into the hollow interior of the blower unit during operation. The gasket may be rubber. The outlet may be made from a high temperature material such as nylon, glass or phenolic. The heating element 246 may have heat covers and other shielding materials 266 insulating the heating element from the housing 240 of the blower unit.

The embodiment of the popping unit shown in FIGS. 11-15 may be used in the same manner as the popping unit of FIGS. 6-10 described previously. The carafe 216 removable lid may be removed once popping is complete to allow the user to utilize the carafe as a serving dispenser. The carafe 216 may be detachably connected with a pedestal, for instance, the pedestal 130 shown in FIGS. 9 and 10. Once popping is complete, the carafe may be placed on the pedestal and used as a serving dispenser.

Figure 16:
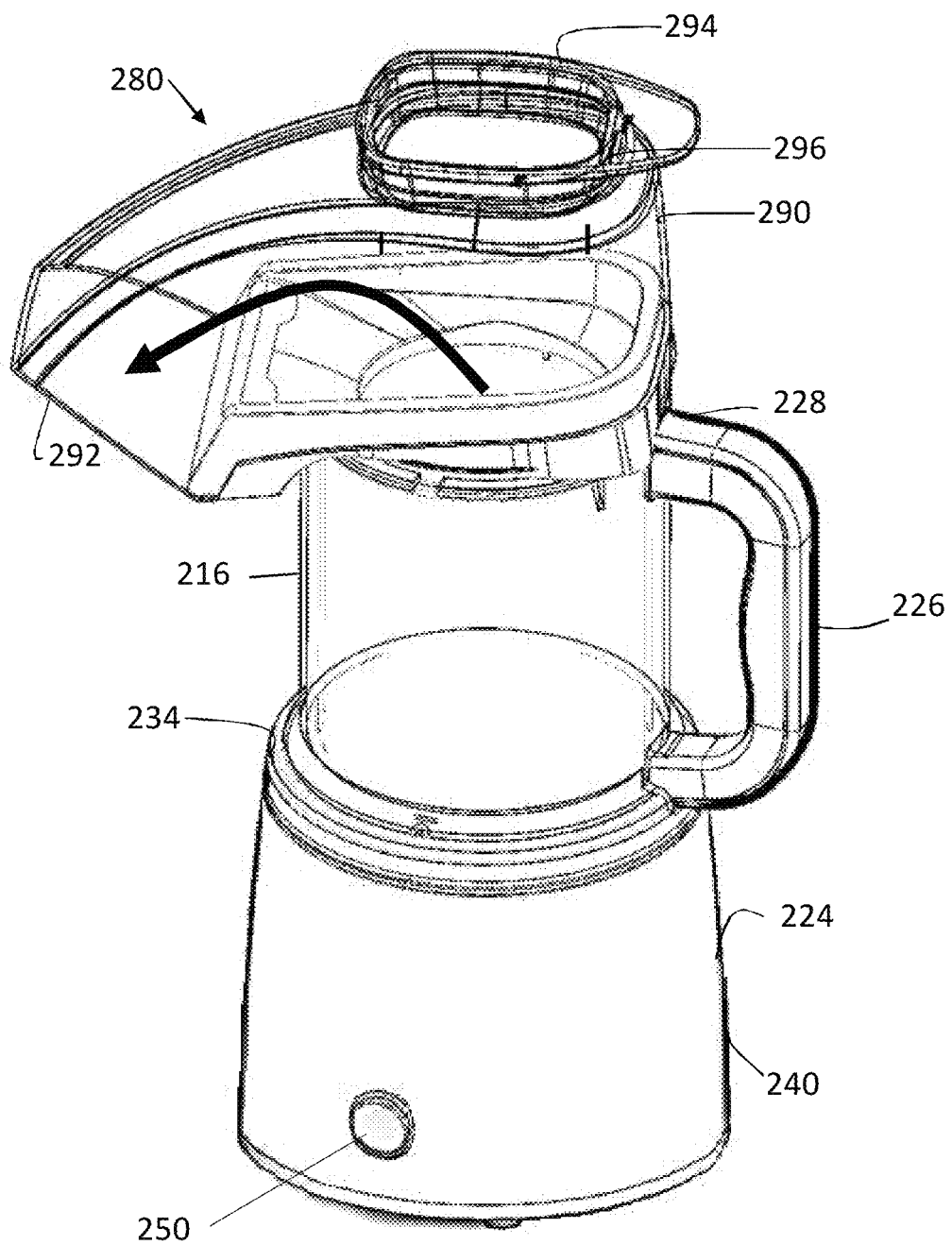
FIG. 16 shows a perspective view of an alternate embodiment of a popping unit with a double wall carafe and dispensing hood.

FIG. 16 shows an alternate embodiment of a popping unit 280. The popping unit 280 is similar in construction to the embodiment of FIGS. 11-15, but the removably connectable lid 230 may be replaced with a hood assembly 290. The hood assembly 290 may be detachably connected to the open top 228 of the carafe 216 to allow the popped kernels to be popped into the carafe and out through an opening 292 in the hood into a separate serving bowl or other serving dispenser. The hood assembly 290 may be formed from a plastic material and need not have a double wall-type construction as the carafe 216. The hood assembly 290 may snap across the open top 228 or may be rotatably detachably connected to the carafe at the open top. The popping unit may be provided with both a hood assembly 290 and perforated lid 230 to provide the user with flexible use. The hood assembly 290 may also have an access 294 with a lid 296 to allow additional kernels and seasonings to be placed in the carafe 216 with the hood assembly 290 in place. The access 294 allows refilling of the popping unit between batches of cooking of the kernels. The access lid 296 may comprise a measuring scoop to assist the user in measuring kernels and seasonings. The access lid scoop 296 may be detachably connected to the hood assembly for ease of storage and to provide access into the interior of the carafe/popping vessel.

Figure 17:
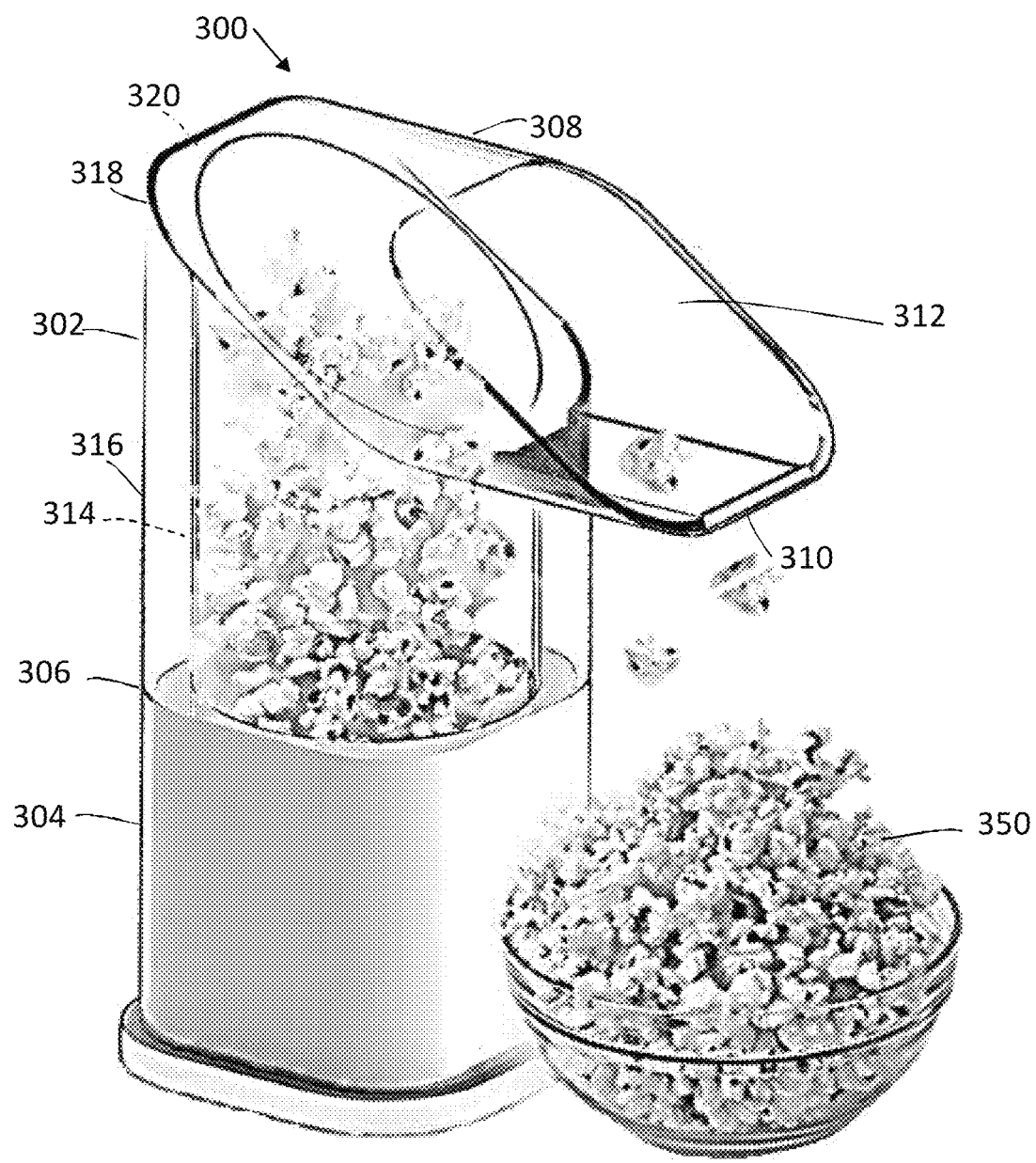
FIG. 17 shows a perspective view of an alternate embodiment of a popping unit with a double wall popping vessel.
Figure 18:
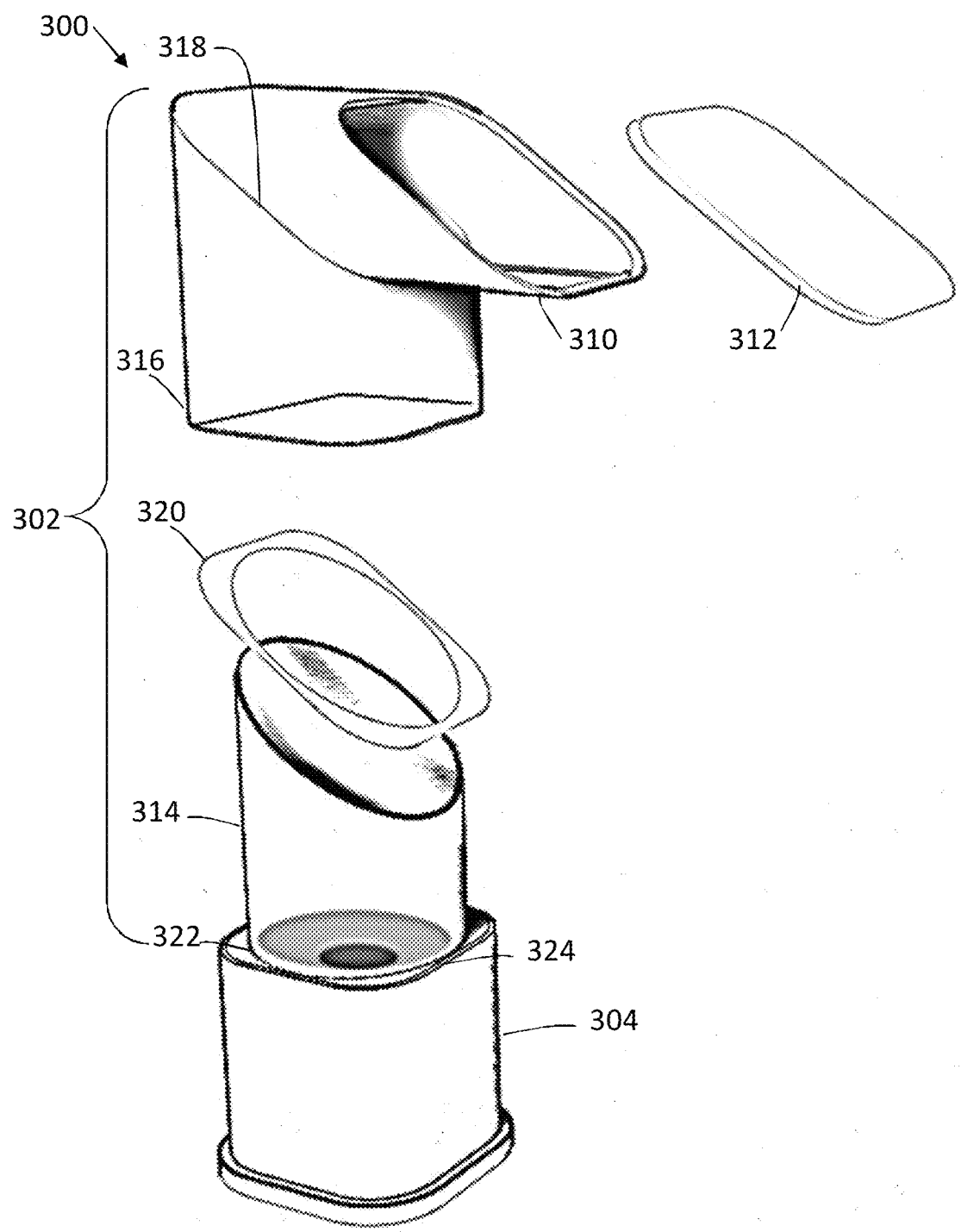
FIG. 18 shows an exploded view of the popping vessel of the popping unit of FIG. 17.

FIGS. 17 and 18 show an alternate embodiment of a popping unit 300 with a popping vessel 302. The popping vessel 302 is mounted on a blower unit 304. The popping vessel 302 may have a generally L shaped appearance with a first end 306 of the popping vessel communicating with the blower unit 304 and a second end 308 of the popping vessel having an opening 310 to allow the popped kernels to exit the popping vessel into a serving dispenser. To provide greater interest for the user during popping operations, the popping vessel may have the opening 310 arranged on an underside of second end 308 of the L shaped popping vessel. In this arrangement, the popped kernels flowing to the second end may fall out of the opening 310 to a serving dispenser 350 under the action of gravity. The second end 308 of the popping vessel may also be angled to deflect popped kernels toward the opening. A cap 312 may in part define the second end 308 of the popping vessel. The cap 312 may be angled. The cap 312 may be attached to the popping vessel by mechanical means, glue, or a sonic weld.

The popping vessel first end 306 may have a double wall construction with an inner sleeve 314 and an outer sleeve 316 outwardly spaced from the inner sleeve. The inner sleeve 314 may be arranged generally vertically with the outer sleeve 316 at the popping vessel first end. The popping vessel second end 308 may have a single wall construction as shown in the drawings. In the alternative, the popping vessel second end may also have a similar double wall construction. At the popping vessel first end 306, the outer sleeve 316 may be spaced away from the inner sleeve 314 to provide an air gap therebetween and insulating effect for the popping vessel. As shown in the drawings, the outer sleeve 316 may define the popping vessel second end 310 with the inner sleeve 314 terminating at a corner 318 of the L-shape. To maintain the spatial arrangement of the outer sleeve and inner sleeve, the popping vessel may be provided with an isolation piece 320. The isolation piece 320 may be provided at the transition from double wall to single wall construction. The isolation piece 320 may be provided at the corner 318. The sleeves 314,316 are constructed from materials that allow the user to see or view the contents of the interior of popping vessel and to create interest for the user during popping operations as pop kernels fill and rise up in the popping vessel. Preferably, the outer sleeve 316 and inner sleeve 314 are transparent. The sleeves 314,316 may also be translucent or made from colored materials that are sufficient to create interest for the viewer in viewing the contents of the vessel 302 during popping operations. The outer sleeve 316 may be made from a clear polymer and the inner sleeve 314 may be made from a glass. The isolation piece 320 may be made of clear silicone or other insulating material.

Additionally, the popping vessel 302 may be mounted to the blower unit 304 in a manner to maintain the popping vessel inner and outer sleeves 314,316 at a desired spacing. The popping vessel 302 may be fixedly mounted to the blower unit 304 or removably connectable with the blower unit. The popping vessel 302 may be removably connectable to the blower unit 304 as a one-piece assembly. For instance, the inner and outer sleeves 314,316 may be removably connectable as an integral unit to the blower unit 304. In the alternative, the popping vessel 302 may be removably connectable to the blower unit 304 with the outer sleeve 316 and inner sleeve 314 each independently removably connectable to the blower unit. In other words, the outer sleeve 316 may be removed from the blower unit with the inner sleeve 314 attached to the blower unit, for instance, to provide access to the inner sleeve and thereafter allow removal of the inner sleeve from the blower unit. The blower unit 304 may have locating surfaces 322,324 to allow locating the outer sleeve on the blower unit and the inner sleeve on the blower unit and to allow the outer sleeve and inner sleeve to be each independently removably connectable to the blower unit. The locating surfaces 322,324 may be concentric. The isolation piece 320 may be fixed to one of the outer sleeve or the inner sleeve to allow removable assembly of the inner sleeve with the outer sleeve and to allow assembly with the blower unit. In the alternative, the outer sleeve 316 may be removably connectable to the blower unit 304 with the inner sleeve 314 fixedly mounted to the blower unit to provide access to an interior of the popping chamber defined by the inner sleeve for instance, to allow cleaning of the popping chamber (i.e., removal of unpopped seeds). The blower unit 304 may have an outer sleeve locating surface 322 to allow locating the outer sleeve on the blower unit with the inner sleeve fixedly mounted on the blower unit. The user may access the interior of the popping chamber at the distal end of the inner sleeve with the inner sleeve proximal end mounted to the blower unit. The isolation piece 320 may be fixed to the inner or the outer sleeve to allow removable assembly of the inner sleeve with the outer sleeve.

Figure 19:
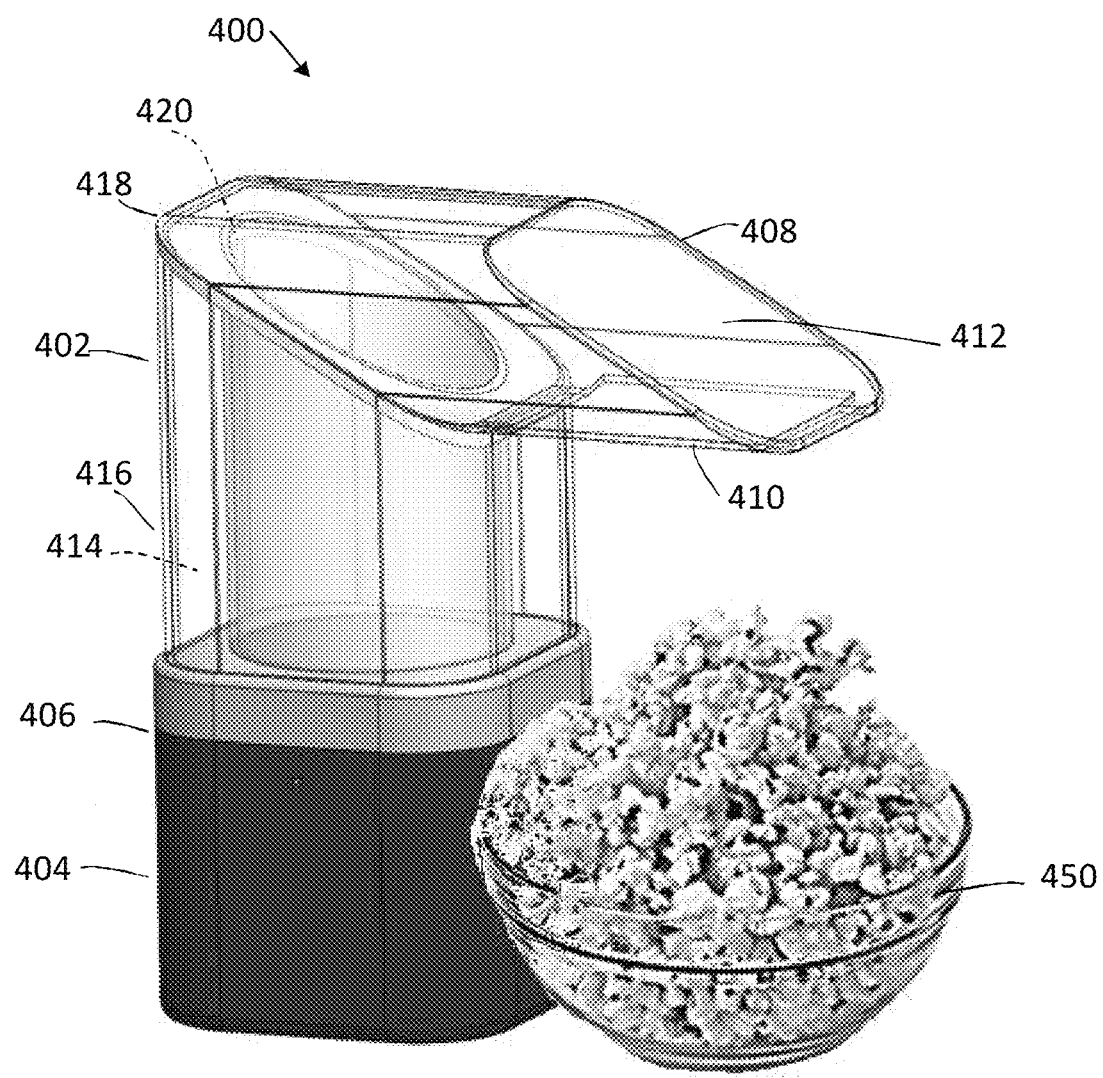
FIG. 19 shows a perspective view of an alternate embodiment of a popping unit with a double wall popping vessel.
Figure 20:
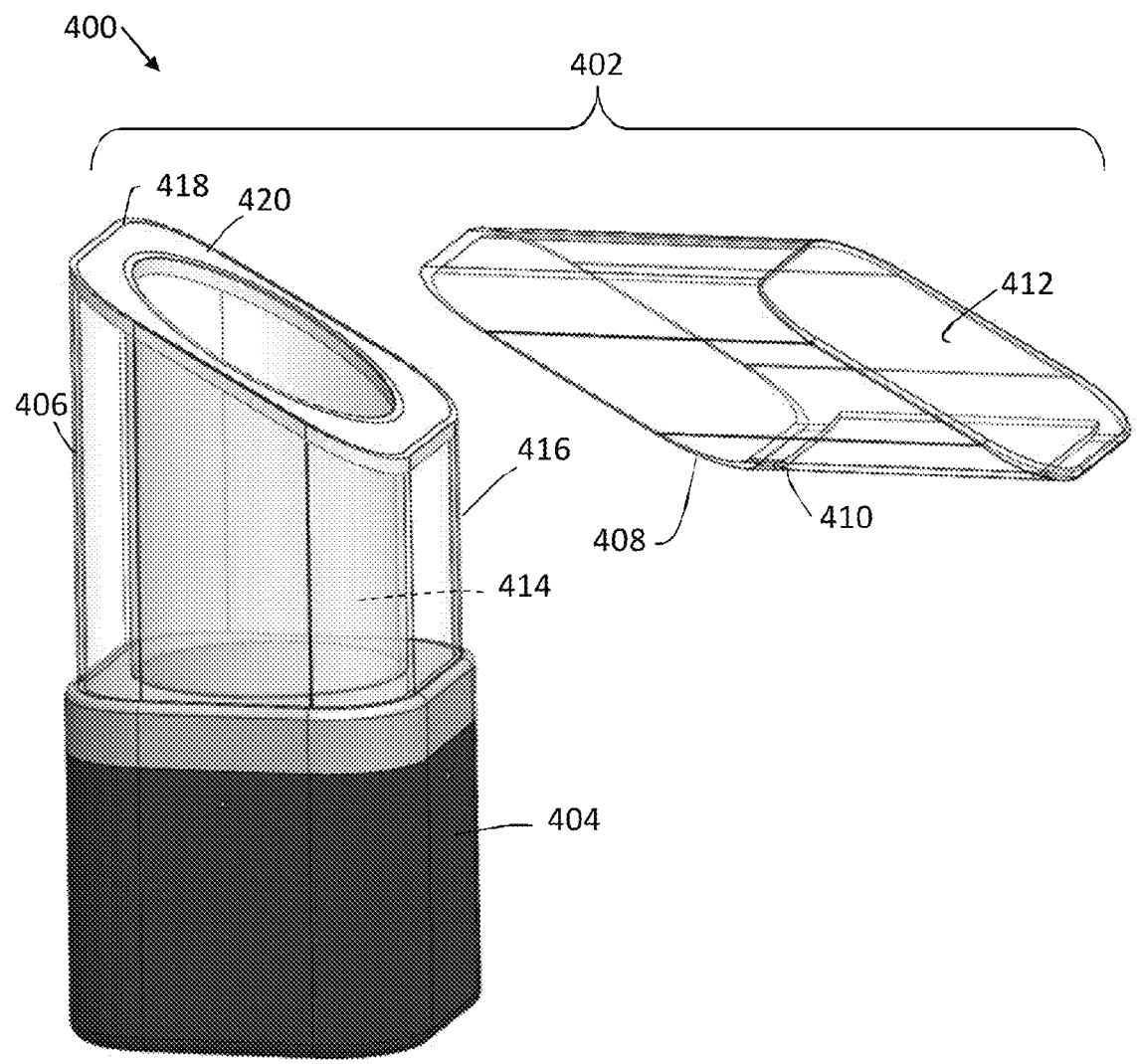
FIG. 20 shows an exploded view of the popping vessel of the popping unit of FIG. 19.

FIGS. 19 and 20 show an alternate embodiment of a popping unit 400 with a popping vessel 402. The popping vessel 402 is mounted on a blower unit 404. The popping vessel 402 may have a generally L-shaped appearance with a first end 406 of the popping vessel communicating with the blower unit 404 and a second end 408 of the popping vessel having an opening 410 to allow the popped kernels to exit the popping vessel into a serving dispenser. To provide greater interest for the user during popping operations, the popping vessel may have the opening 410 arranged on an underside of second end 408 of the L-shaped popping vessel. In this arrangement, the popped kernels flowing to the second end may fall out of the opening 410 to a serving dispenser 450 under the action of gravity. The second end 408 of the popping vessel may also be angled to deflect popped kernels toward the opening. A cap 412 may in part define the second end 408 of the popping vessel. The cap 412 may be angled. The cap 412 may be attached to the popping vessel by mechanical means, glue, or a sonic weld.

The popping vessel first end 406 may have a double wall construction with an inner sleeve 414 and an outer sleeve 416 outwardly spaced from the inner sleeve. The inner sleeve 414 may be arranged generally vertically with the outer sleeve 416 at the popping vessel first end. The popping vessel second end 408 may have a single wall construction as shown in the drawings. In the alternative, the popping vessel second end may also have a similar double wall construction. At the popping vessel first end 406, the outer sleeve 416 may be spaced away from the inner sleeve 414 to provide an air gap therebetween and insulating effect for the popping vessel. As shown in the drawings, the outer sleeve 416 may define the popping vessel second end 410 with the inner sleeve 414 terminating at a corner 418 of the L-shape. To maintain the spatial arrangement of the outer sleeve and inner sleeve, the popping vessel may be provided with an isolation piece 420. The isolation piece 420 may be provided at the transition from double wall to single wall construction. The isolation piece 420 may be provided at the corner 418. The sleeves 414,416 are constructed from materials that allow the user to see or view the contents of the interior of popping vessel and to create interest for the user during popping operations as pop kernels fill and rise up in the popping vessel. Preferably, the outer sleeve 416 and inner sleeve 414 are transparent. The sleeves 414,416 may also be translucent or made from colored materials that are sufficient to create interest for the viewer in viewing the contents of the vessel 402 during popping operations. The outer sleeve 416 may be made from a clear polymer and the inner sleeve 414 may be made from a glass. The isolation piece 420 may be made of clear silicone or other insulating material.

In the embodiment of FIGS. 19 and 20, the first end 406 of the popping vessel 402 may be fixedly mounted to the blower unit 404 thereby maintaining the popping vessel inner and outer sleeves 414,416 at a desired spacing. The isolation piece 420 may also be fixed to both the outer sleeve 416 and the inner sleeve 414 to maintain the sleeves at a desired spacing. The second end 408 may be removably connectable with the popping vessel first end 406 to allow access to deposit kernels for cooking and/or to the popping chamber for cleaning and removal of uncooked kernels. For instance, the cover second end 408 may be removably attached to the double wall first end 406 to allow access to a mechanical seed removal device as disclosed in application Ser. No. 14/280,989, the disclosure of which is incorporated by reference herein. As shown in the drawings, the first end of the popping vessel may have its distal end define a plane that is acutely angled to a plane defined by a proximal end of the first end of the popping vessel. In the alternative, the distal end of the first end of the popping vessel may define a plane that is parallel to the plane defined by the proximal end of the first end of the popping vessel.

Figure 21:
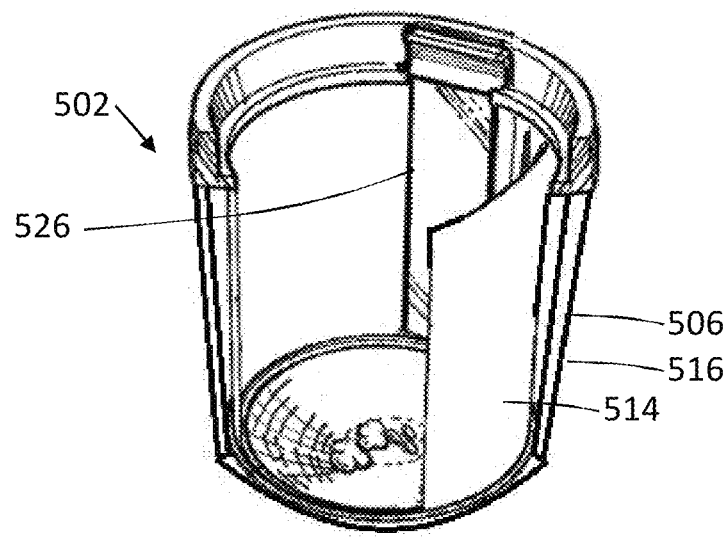
FIG. 21 shows a partial, cross-section view of an alternate embodiment of a double walled popping vessel of a popping unit configured for mechanical removal of un-popped kernels.
Figure 22:
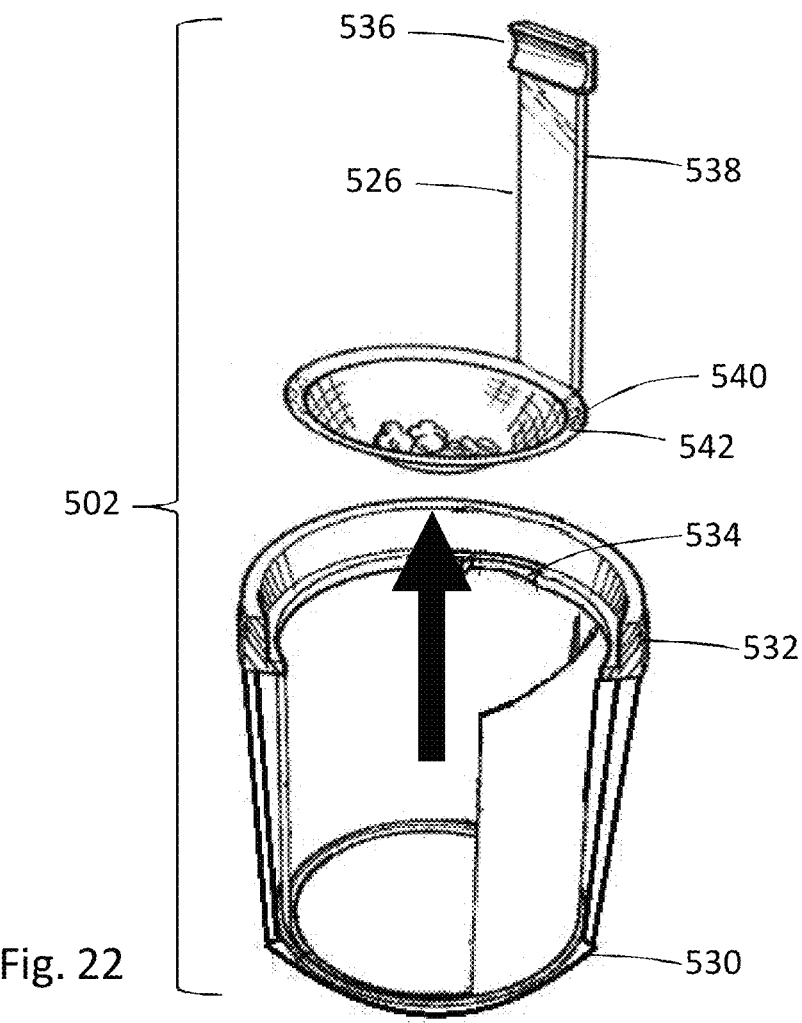
FIG. 22 shows an exploded view of the popping vessel of the popping unit of FIG. 21.

FIGS. 21 and 22 shows an example of a mechanical seed cleaning device used in connection with a double wall popping vessel 502. The double wall popping vessel 502 is shown with a portion of its first end 506 cut-way for ease of illustration. The cut away first end portion may comprise a portion of the first end previously described in connection with FIGS. 17-20. The popping vessel 502 includes a ladle member 526 which is positioned in the popping vessel above the heated air plenum 530 associated with the popping unit. The popping vessel 502 comprises inner and outer sleeves 514,516. The bottom axial ends of the sleeves 514,516 are positioned over the heated air plenum 530 and the top end exits to the second end cover (not shown). The ladle member 526 is removably attached to the popping vessel 502 and may be removed from the popping chamber by the user to clean and remove unwanted kernels from the popping unit. A rim 532 around the top open end of the first end 506 of the popping vessel may have a notch 534 to releasably secure the ladle member 526 to the popping vessel. The notch may also be provided in the isolation piece previously described. The rim may define the transition of the popping vessel first end to the popping second end and may be angled like the corner previously described. The ladle member comprises a tab 536 with a depending arm 538 extending to a screen portion 540. The screen portion 540 may contain the kernels. The kernels may be delivered to the popping chamber and located on the screen portion 540 by removing the cover second end 508. The ladle member screen portion 540 may have a flexible outer rim 542 to allow the screen portion to conform to the bottom opening of the popping chamber adjacent to the heated air plenum 530. The screen portion 540 may form the cooking surfaces associated with the popping unit. The screen portion 540 allows heated and pressurized air to flow through the screen portion to pop the kernels and direct the popped kernels through the popping vessel and out through the opening in the second end and into a serving dispenser. Once popping operations are completed, the second end cover may be detached from the popping vessel first end 506 to expose the inside of the popping vessel 502 and the ladle member tab 536. The ladle member tab 536 may then be released from the notch 534 in the rim 532 and lifted vertically upward. Unpopped kernels collected on the screen portion 540 may be removed from the popping vessel. Once the kernels are removed and discarded, the ladle member 526 may be repositioned in the popping chamber for future use with the tab 536 engaged in the notch 534 and the screen portion 540 positioned over the heated air plenum 530.

The embodiments were chosen and described in order to best explain the principles of the disclosure and their practical application to thereby enable others skilled in the art to best utilize said principles in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A popcorn popping unit comprising a blower unit and a popping vessel, the popping vessel having first and second parts assemblable with one another to form the popping vessel, the first part having a proximal end being operatively mounted on the blower unit and a distal end spaced from the proximal end, the second part being removably connected with the first part distal end at a transition, the second part having an opening spaced from the transition, the opening being configured to vent pressurized air generated by the blower during cooking operations and pass popped popcorn kernels received from the popping vessel first part through the opening, the popping vessel first part having inner and outer walls spaced apart from one another to form a double wall construction for the first part of the popping vessel, the popping vessel first part double wall construction defining concentric sleeves with a center axis and the popping vessel second part being arranged perpendicular to the popping vessel first part sleeves center axis with the transition being arranged in a plane at an acute angle to both the popping vessel first and second parts, the second part opening being arranged in a plane perpendicular to the popping vessel first part sleeves center axis and laterally offset therefrom, the popping vessel first part extending outward from the blower unit a distance sufficient to allow the popped popcorn kernels to be visible therein and to accumulate therein to the transition point before the popped popcorn kernels pass to the popping vessel second part.

2. The popcorn unit of claim 1 wherein the popping vessel second part comprises a hood.

3. The popcorn unit of claim 1 wherein the popping vessel first part proximal end is fixedly mounted to the blower unit and its distal end is removably connectable to the second part.

4. The popcorn unit of claim 3 wherein the first and second parts are removably assemblable with one another in such a manner as to allow a user access to an interior of the popping chamber from the distal end of the first part.

5. The popcorn unit of claim 1 wherein the inner wall of the double wall construction is glass.

6. A popcorn popping unit comprising a blower unit and a popping vessel, the popping vessel having first and second parts, the first part being operatively connected to the blower unit, the second part being removably assemblable with the first part at a transition to form the popping vessel, the blower unit having a heating element and a blower fan, the blower unit being adapted to direct heated air into an interior of the popping vessel first part to pop kernels of corn and move the popped kernels of corn from the popping vessel first part toward the popping vessel second part and out through an opening formed in the second part of the popping vessel, the popping vessel first part having an insulated, double wall construction comprising an outer wall outwardly spaced from an inner wall, the popping vessel first part double wall construction defining concentric sleeves with a center axis and the popping vessel second part being arranged perpendicular to the popping vessel first part sleeves center axis with the transition being arranged in a plane at an acute angle to both the popping vessel first and second parts, the second part opening being arranged in a plane perpendicular to the popping vessel first part sleeves center axis and laterally offset therefrom, the popping vessel first part extending outward from the blower unit a distance sufficient to allow the popped popcorn kernels to be visible therein and to accumulate therein to the transition point before the popped popcorn kernels pass to the popping vessel second part.

7. The popcorn unit of claim 6 wherein the inner wall of the insulated double wall construction is glass.

8. The popcorn unit of claim 6 wherein the first part proximal end is fixedly mounted to the blower unit and its distal end is removably connectable to the second part at the transition.

9. The popcorn unit of claim 8 wherein the first and second parts are removably assemblable with one another in such a manner as to allow a user access to an interior of the popping chamber from the distal end of the first part.

\* \* \* \* \*